US012763694B2

(12) United States Patent
Kadoi et al.

(10) Patent No.: US 12,763,694 B2
(45) Date of Patent: Oct. 13, 2026

(54) SWITCHING POWER SUPPLY CIRCUIT AND ELECTRONIC DEVICE INCLUDING SWITCHING POWER SUPPLY CIRCUIT

(71) Applicant: Hitachi, Ltd., Tokyo (JP)

(72) Inventors: Ryo Kadoi, Tokyo (JP); Wen Li, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 18/859,740

(22) PCT Filed: Apr. 20, 2023

(86) PCT No.: PCT/JP2023/015819
§ 371 (c)(1),
(2) Date: Oct. 24, 2024

(87) PCT Pub. No.: WO2024/034191
PCT Pub. Date: Feb. 15, 2024

(65) Prior Publication Data
US 2025/0266769 A1 Aug. 21, 2025

(30) Foreign Application Priority Data
Aug. 12, 2022 (JP) ................................ 2022-128853

(51) Int. Cl.
*H02M 3/337* (2006.01)
*H02M 1/00* (2007.01)
*H02M 3/335* (2006.01)

(52) U.S. Cl.
CPC ....... *H02M 3/3378* (2013.01); *H02M 1/0025* (2021.05); *H02M 3/3353* (2013.01)

(58) Field of Classification Search
CPC . H02M 1/0025; H02M 3/3353; H02M 3/3378
See application file for complete search history.

(56) References Cited

U.S. PATENT DOCUMENTS 4,584,635 A * 4/1986 MacInnis .......... H02M 7/53806 363/25
5,317,496 A * 5/1994 Seiersen ............ H02M 3/3378 363/24

(Continued)

FOREIGN PATENT DOCUMENTS

JP 11-187662 A 7/1999
JP 2000-102249 A 4/2000

(Continued)

OTHER PUBLICATIONS

International Search Report (PCT/ISA/210) issued in PCT Application No. PCT/JP2023/015819 dated May 30, 2023 with English translation (6 pages).

(Continued)

*Primary Examiner* — Jue Zhang
(74) *Attorney, Agent, or Firm* — Crowell & Moring LLP

(57) ABSTRACT

To provide a switching power supply circuit that can reduce an amount of a radiated electromagnetic noise even in a case of a jitter in a load, a set voltage, or the like. The switching power supply circuit includes: a pulse width control unit configured to control a pulse width of a pulse voltage output from a switching transistor; a drive voltage control unit configured to control a drive voltage for determining a magnitude of the pulse voltage output from the switching transistor; and a weighting factor calculation unit configured to determine a weighting factor for the pulse width and a weighting factor for the drive voltage based on a difference value between a set output voltage value set in advance for a power supply circuit and a measured output voltage value, which is a result of measuring an output voltage of the power supply circuit, and the set output voltage value.

7 Claims, 10 Drawing Sheets

(56) References Cited

U.S. PATENT DOCUMENTS

| | | | | |
|---|---|---|---|---|
| 7,893,558 | B2 * | 2/2011 | Lee | H02J 9/062 307/64 |
| 2012/0250369 | A1 * | 10/2012 | Furukawa | H02M 3/33584 363/25 |
| 2015/0249386 | A1 | 9/2015 | Maede et al. | |

FOREIGN PATENT DOCUMENTS

| | | | |
|---|---|---|---|
| JP | 2014-168342 | A | 9/2014 |
| JP | 2015-167442 | A | 9/2015 |
| JP | 2020-89079 | A | 6/2020 |

OTHER PUBLICATIONS

Japanese-language Written Opinion (PCT/ISA/237) issued in PCT Application No. PCT/JP2023/015819 dated May 30, 2023 with English translation (5 pages).

* cited by examiner

[FIG. 1]
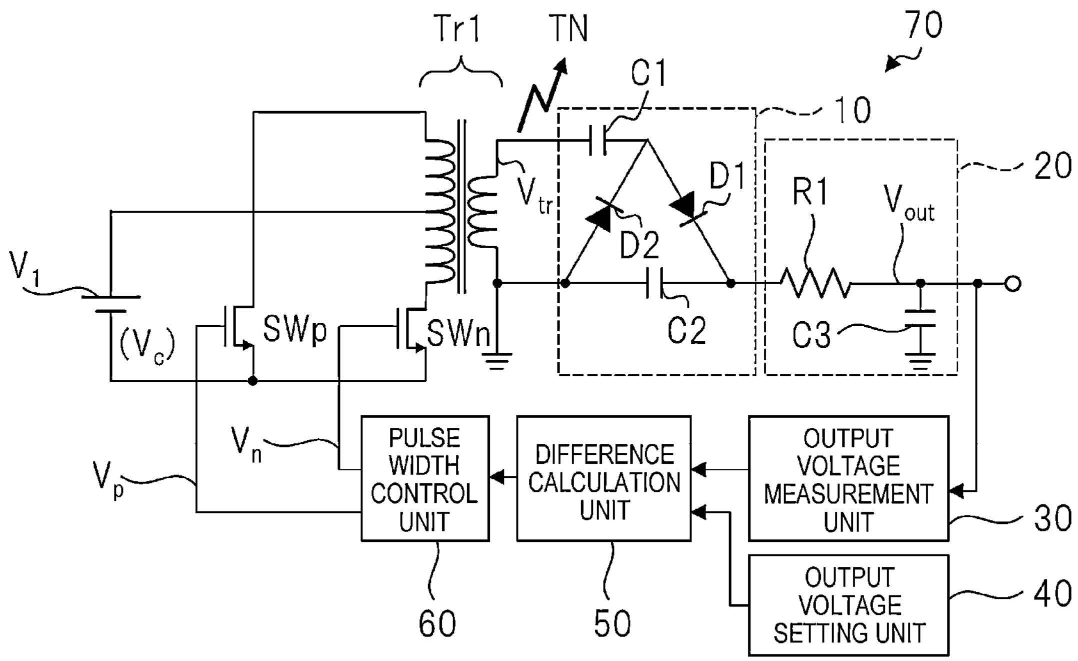

LARGE VOLTAGE OUTPUT (LARGE PULSE WIDTH)
SMALL VOLTAGE OUTPUT (SMALL PULSE WIDTH)
FIG. 2A
FIG. 2D
FIG. 2B
FIG. 2E
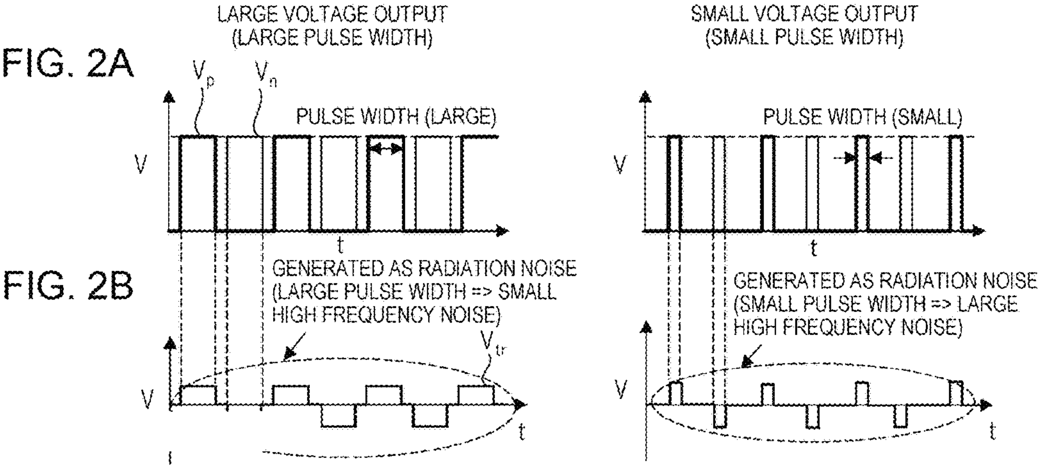
FIG. 2C
FIG. 2F
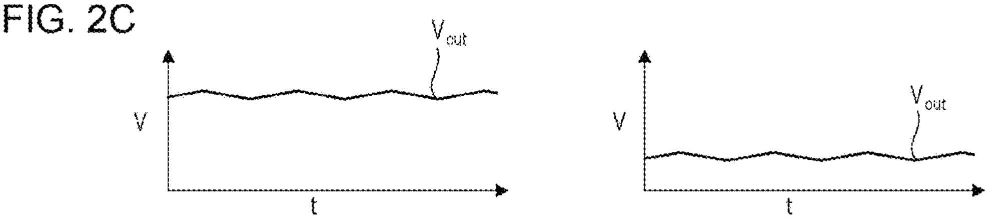

[FIG. 3]
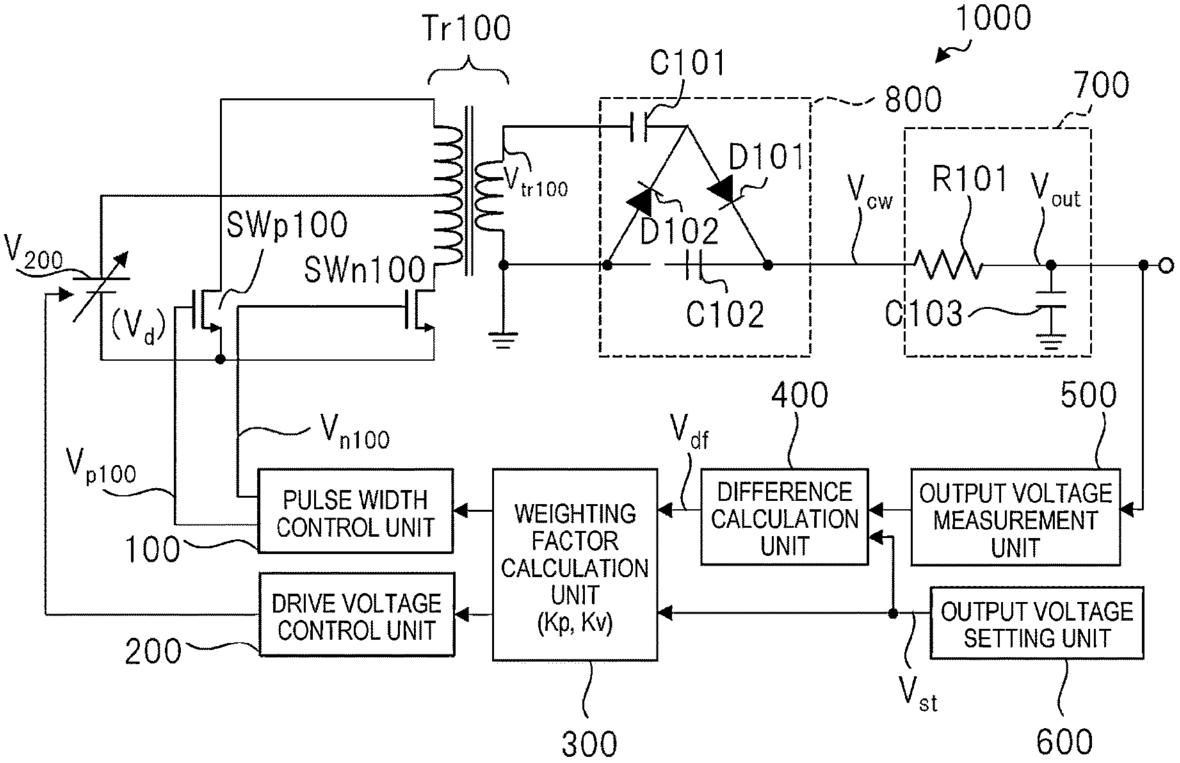

[FIG. 5]
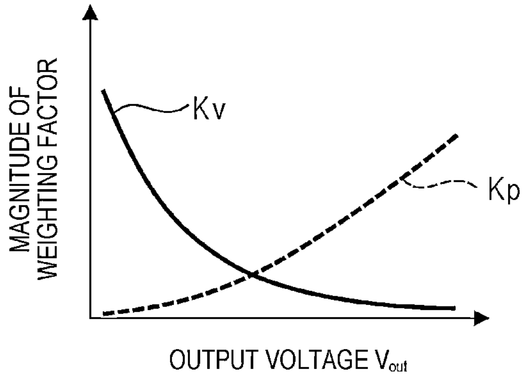

FIG. 7A

DUTY RATIO > DML(LOWER LIMIT VALUE)

$$Kp = \frac{V_{out}}{V_{outMAX}} \quad \cdots (1)$$

$$Kv = 1 - \frac{V_{out}}{V_{outMAX}} \quad \cdots (2)$$

$$Kp + Kv = 1 \quad \cdots (3)$$

FIG. 7B

DUTY RATIO ≤ DML(LOWER LIMIT VALUE)

$$Kp = 0 \quad \cdots (4)$$

$$Kv = 1 \quad \cdots (5)$$

$$\frac{R_{fp}}{R_i} = Kp \qquad \frac{R_{fv}}{R_i} = Kv$$

[FIG. 9]
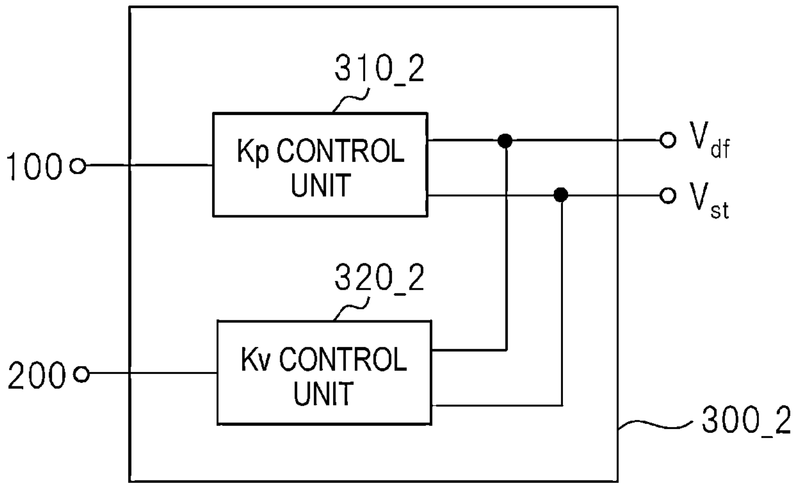
[FIG. 10]
| SET OUTPUT VOLTAGE VALUE/ MAXIMUM OUTPUT VOLTAGE | Kp | Kv |
|---|---|---|
| 0 | 0.00 | 1.00 |
| 0.01 | 0.01 | 0.99 |
| 0.02 | 0.02 | 0.98 |
| 0.03 | 0.03 | 0.97 |
| ⋮ | ⋮ | ⋮ |
| 0.97 | 0.97 | 0.03 |
| 0.98 | 0.98 | 0.02 |
| 0.99 | 0.99 | 0.01 |
| 1 | 1.00 | 0.00 |

SWITCHING POWER SUPPLY CIRCUIT AND ELECTRONIC DEVICE INCLUDING SWITCHING POWER SUPPLY CIRCUIT

TECHNICAL FIELD

The present disclosure relates to a switching power supply circuit, and more particularly to a technique that is effective for reducing an amount of a radiated radio noise radiated from the switching power supply circuit.

BACKGROUND ART

In recent years, in fields of mobility and industrial devices, a partial update service for hardware is being performed for long-term use and long-term operation. Therefore, a technique for ensuring stable operation of an electronic system even after an update is important.

Specifically, a technique for making a radiated electromagnetic noise radiated from the electronic system conform to various standards and a technique for reducing the radiated electromagnetic noise of a device in the electronic system are important.

For example, in order to reduce a load on the environment, adoption of a switching power supply circuit having high power efficiency is increasing also in a power supply circuit. Examples of an electronic device including the power supply circuit include electronic equipment in a vehicle such as an automobile, a control device and electronic equipment in an industrial device, but are not limited to these devices.

The switching power supply circuit has power efficiency higher than that of a linear regulator (dropper) power supply circuit. However, in the switching power supply circuit, the radiated electromagnetic noise is generated due to a switching timing of rising and falling a pulse signal used in the switching power supply circuit. In particular, when a pulse width of the pulse signal decreases, the radiated electromagnetic noise increases in a radio-frequency band.

For example, PTL 1 discloses a switching power supply circuit that can improve a power supply rejection ratio (PSRR). Specifically, in a technique of PTL 1, a sampling timing of an A/D converter is set to any position in a slope of a ripple of an output voltage. It is disclosed that as a result, even when an input voltage fluctuates and an amount of the ripple of the output voltage changes, a center of the ripple of the output voltage is stabilized to a reference voltage depending on a target value, and the PSRR can be improved.

CITATION LIST

Patent Literature

PTL 1: JP2015-167442A

SUMMARY OF INVENTION

Technical Problem

Despite operational improvements described above, there is a problem that the amount of the radiated electromagnetic noise cannot be adjusted when the electronic equipment or the control device is updated or when a load or a set voltage of an operating device fluctuates due to a voltage adjustment of the device or components in the device.

The disclosure has been made in view of the above. An object of the disclosure is to provide a switching power supply circuit that can reduce the amount of the radiated electromagnetic noise even in a case of the jitter in the load, the set voltage, or the like of the switching power supply circuit, and an electronic device including the switching power supply circuit. Other problems and novel features will become apparent from the description of the present specification and the accompanying drawings.

Solution to Problem

A representative overview of an invention among inventions disclosed in the present application will be simply described below. A representative switching power supply circuit includes: a pulse width control unit configured to control a pulse width of a pulse voltage output from a switching transistor; a drive voltage control unit configured to control a drive voltage for determining a magnitude of the pulse voltage output from the switching transistor; and a weighting factor calculation unit configured to determine a weighting factor for the pulse width and a weighting factor for the drive voltage based on a difference value between a set output voltage value set in advance for a power supply circuit and a measured output voltage value, which is a result of measuring an output voltage of the power supply circuit, and the set output voltage value.

Advantageous Effects of Invention

According to one embodiment, it is possible to provide a switching power supply circuit that can reduce an amount of a radiated electromagnetic noise even in a case of a jitter in a load, a set voltage, or the like, and a device including the switching power supply circuit.

BRIEF DESCRIPTION OF DRAWINGS

FIG. 1 is a block diagram illustrating an example of an overall configuration of a switching power supply circuit using a PWM control serving as a comparative example.

FIG. 2A is a schematic diagram of a pulse waveform in a case where pulse widths applied to gates of switching transistors of the switching power supply circuit in FIG. 1 are large (a duty ratio of the pulses is large). FIG. 2B is a diagram schematically illustrating a waveform induced on a secondary side in a case where the pulse waveform in FIG. 2A is applied to a primary side of a transformer. FIG. 2C is a diagram illustrating an example of an output voltage of the switching power supply circuit after the waveform in FIG. 2B passes through a low-pass filter. FIG. 2D is a schematic diagram of a pulse waveform in a case where pulse widths applied to the gates of the switching transistors of the switching power supply circuit in FIG. 1 are small (the duty ratio of the pulses is small). FIG. 2E is a diagram schematically illustrating a waveform induced on the secondary side in a case where the pulse waveform in FIG. 2D is applied to the primary side of the transformer. FIG. 2F is a diagram illustrating an example of the output voltage of the switching power supply circuit after the waveform in FIG. 2D passes through the low-pass filter.

FIG. 3 is a block diagram illustrating an example of an overall configuration of a switching power supply circuit according to the present embodiment.

FIG. 5 is an image diagram schematically illustrating the change in the weighting factor $K_p$ and the change in the weighting factor $K_v$.

FIG. 7A is a diagram illustrating formulas indicating the weighting factor $K_p$, the weighting factor $K_v$, and a relation between the weighting factor $K_p$ and the weighting factor $K_v$ under a predetermined condition of a switching power supply circuit according to a modification of the present embodiment. FIG. 7B is a diagram illustrating an example of values of the weighting factor $K_p$ and the weighting factor $K_v$ under another predetermined condition of the switching power supply circuit according to the modification of the present embodiment.

FIG. 9 is a diagram illustrating another example of the weighting factor calculation unit of the switching power supply circuits according to the present embodiment and the modification of the present embodiment.

FIG. 10 is a diagram illustrating an example of a case where the weighting factors of the switching power supply circuit according to the modification of the present embodiment are provided as a lookup table.

DESCRIPTION OF EMBODIMENTS

Figure 4A:
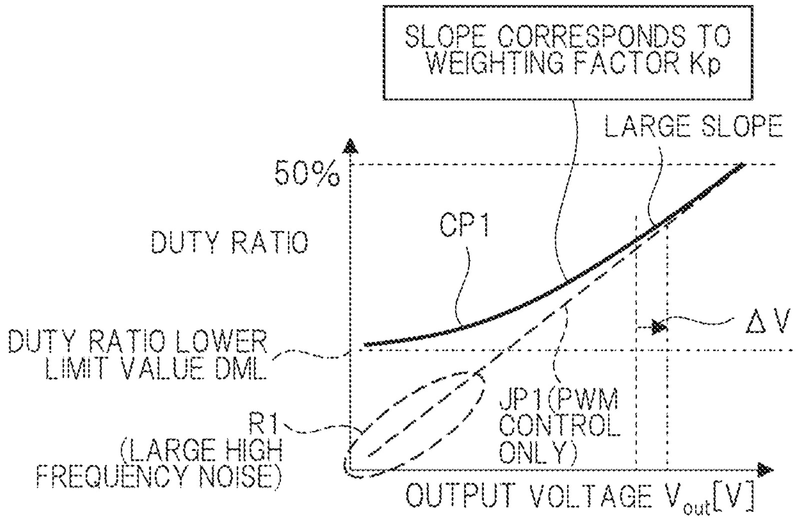
FIG. 4A is a diagram illustrating a change in a weighting factor $K_p$, which is calculated by a weighting factor calculation unit of the switching power supply circuit according to the present embodiment in FIG. 3, by a slope of a curve CP1.

In the following embodiments, when necessary for convenience, the description will be made by being divided into a plurality of sections or embodiments, but unless otherwise stated, they are not unrelated to each other, and one has a relation with all or a part of modifications, details, supplementary explanations, and the like of the other. In the following embodiments, when referring to the number of elements (including the number, numerical values, amounts, ranges, or the like) or the like, the number of elements is not limited to a specific number, and may be the specific number or more or the specific number or less, unless otherwise specified or except a case where the number is apparently limited to a specific number in principle.

Further, in the following embodiments, it is needless to mention that components (also including element steps and the like) thereof are not necessarily essential unless otherwise specified or unless clearly considered to be essential in principle. Similarly, in the following embodiments, when a shape, a positional relation, or the like of a component or the like is referred to, the shape or the like is substantially approximate or similar to the shape or the like unless otherwise specified or clearly considered otherwise in principle. The same applies to the above numerical values and ranges.

A circuit element constituting a functional block according to the embodiments is not particularly limited, and is formed on a semiconductor substrate such as single-crystal silicon by a well-known integrated circuit technique such as a complementary MOS transistor (CMOS), or is formed on a circuit board on which electronic components such as IC are mounted in combination.

Hereinafter, the embodiments of the disclosure will be described in detail with reference to the drawings. In all drawings for describing the embodiments, the same members are denoted by the same reference numerals in principle, and repeated description thereof will be omitted. Furthermore, dimensional ratios in the drawings are exaggerated for convenience of description, and may be different from actual ratios.

(Description for Operation Principle of Switching Power Supply Circuit Using Pulse Width Modulation (PWM) Control and Generation Principle of Radiated Electromagnetic Noise)

FIG. 1 is a block diagram illustrating an example of an overall configuration of a switching power supply circuit 70 using the PWM control. The switching power supply circuit 70 includes an input voltage source $V_1$, switching transistors SWp and SWn, a transformer Tr1, a rectifier circuit unit 10, a low-pass filter unit 20, an output voltage measurement unit 30, an output voltage setting unit 40, a difference calculation unit 50, and a pulse width control unit 100. Since a basic operation of the switching power supply circuit using the PWM control is a related art, a detailed description thereof will be omitted and a portion according to the present embodiment will be mainly described.

The input voltage source $V_1$ outputs a constant voltage value $V_c$. The output voltage measurement unit 30 measures a voltage value of an output voltage $V_{out}$ output from the low-pass filter unit 20. The difference calculation unit 50 calculates a difference voltage value that is a difference between the value of the output voltage $V_{out}$ and a target voltage value set by the output voltage setting unit 40, and calculates how much a current output voltage value deviates from the target voltage value. The pulse width control unit 100 controls pulse widths of the switching transistors SWp and SWn based on the difference voltage value.

For example, when the difference voltage value is large and the current output voltage value is smaller than the target voltage value, the pulse width control unit 100 sets the pulse widths of the switching transistors SWp and SWn to be large. In addition, when the difference voltage value is large and the current output voltage value is larger than the target voltage value, the pulse width control unit 100 sets the pulse widths of the switching transistors SWp and SWn to be small.

A secondary voltage $V_{tr}$ induced by a pulse voltage on a primary side of the transformer Tr1 is generated on a secondary side of the transformer Tr1. In the present embodiment, a radiated electromagnetic noise TN generated by the secondary voltage $V_{tr}$ will be focused on and described in detail below.

(A), (B), and (C) of FIG. 2 are each a graph illustrating an operation in a case where pulse widths of pulses (VP and V) applied to gates of the switching transistors SWp and SWn are large and an output voltage is relatively large in the switching power supply circuit 70 using the PWM control in FIG. 1.

(A) of FIG. 2 illustrates a state in which an ON state is longer than an OFF state of the switching transistors SWp and SWn, that is, the pulse widths applied to the gates of the switching transistors are large and a duty ratio is large (the duty ratio is larger than 0.25).

(B) of FIG. 2 illustrates a change in the secondary voltage $V_{tr}$ induced on the secondary side of the transformer Tr1 by the pulses in (A) of FIG. 2. When the switching transistor SWp is in the ON state, a pulse is generated on a positive side with respect to a midpoint voltage. In addition, when the switching transistor SWn is in the ON state, a pulse is generated on a negative side with respect to the midpoint voltage. A switching frequency is, for example, several kilohertz to several hundred kilohertz. On the other hand, since the pulse width is large, a radio-frequency component of a radiated electromagnetic noise generated at rising and falling of the secondary voltage $V_{tr}$ is relatively small.

(C) of FIG. 2 illustrates the voltage value of the output voltage $V_{out}$ output from the low-pass filter unit 20, and illustrates a state in which the radio-frequency component is reduced by the low-pass filter unit 20.

(D), (E), and (F) of FIG. 2 are each a graph illustrating an operation in a case where the pulse widths of the pulses (VP and V) applied to the gates of the switching transistors SWp and SWn are small and the output voltage is relatively small in the switching power supply circuit 70 using the PWM control in FIG. 1.

(D) of FIG. 2 illustrates a state in which the ON state is shorter than the OFF state of the switching transistors SWp and SWn, that is, the pulse widths applied to the gates of the switching transistors are small, and the duty ratio is small (the duty ratio is smaller than 0.5).

(E) of FIG. 2 illustrates a change in the secondary voltage $V_{tr}$ induced on the secondary side of the transformer Tr1 by the pulses in (D) of FIG. 2. When the switching transistor SWp is in the ON state, a pulse having a small pulse width is generated at a positive side with respect to the midpoint voltage. In addition, when the switching transistor SWn is in the ON state, a pulse having a small pulse width is generated on a negative side with respect to the midpoint voltage. A switching frequency is, for example, several kilohertz to several hundred kilohertz. On the other hand, since the pulse width is small, the radio-frequency component of the radiated electromagnetic noise generated at the rising and falling of the secondary voltage $V_{tr}$ is relatively large. When attempting to lower the output voltage of the switching power supply circuit 70 using the PWM control, an output voltage of the input voltage source $V_1$ is the constant voltage value $V_c$, and therefore, the duty ratio of the switching transistor decreases, and the radio-frequency component of the radiated electromagnetic noise increases. That is, as the duty ratio decreases, an impulse-like pulse tends to be generated, and the radio-frequency component of the radiated electromagnetic noise tends to increase.

(F) of FIG. 2 illustrates the voltage value of the output voltage $V_{out}$ output from the low-pass filter unit 20, and illustrates a state in which the radio-frequency component is reduced by the low-pass filter unit 20.

EMBODIMENTS

FIG. 3 is a block diagram illustrating an example of an overall configuration of a switching power supply circuit 1000 according to the present embodiment. The switching power supply circuit 1000 includes an input voltage source $V_{200}$ (variable output), switching transistors SWp100 and SWn100, a transformer Tr100, a rectifier circuit unit 800, a low-pass filter unit 700, an output voltage measurement unit 500, an output voltage setting unit 600, a difference calculation unit 400, a weighting factor calculation unit 300, a drive voltage control unit 200, and a pulse width control unit 100.

The pulse width control unit 100 controls duty ratios of the switching transistors SWp100 and SWn100. However, the duty ratio has a duty ratio lower limit value DML, and the pulse width control unit 100 does not set the duty ratio smaller than the duty ratio lower limit value DML. The duty ratio lower limit value DML can be determined based on a frequency of the radiated electromagnetic noise and an intensity of the radiated electromagnetic noise. For example, the duty ratio lower limit value DML can be set such that the frequency of the radiated electromagnetic noise and the intensity of the radiated electromagnetic noise fall within ranges conforming to domestic (in Japan) and international standards that regulate the radiated electromagnetic noise. As an example, the duty ratio lower limit value DML can be set to 0.2, that is, a proportion of the duty ratio corresponding to the duty ratio lower limit value DML can be set to 20%. Examples of the domestic standard in Japan include voluntary control council for interference by information technology equipment (VCCI) standard. Further, examples of the international standard include federal communication commission (FCC) standard and European conformity (CE) in Europe. A value of the duty ratio lower limit value DML and the proportion of the duty ratio corresponding to the duty ratio lower limit value DML can also be set to any value.

The drive voltage control unit 200 can control a drive voltage $V_d$, which is an output voltage of the input voltage source $V_{200}$, to be changed. Since the switching power supply circuit in the related art does not include the drive voltage control unit 200 according to the present embodiment, an output voltage value of an input voltage source is a constant value even when an output voltage value of the switching power supply circuit decreases. Therefore, the pulse width control unit 60 may control the duty ratio to be smaller than the duty ratio lower limit value DML, the radiated electromagnetic noise may move from a low frequency band to a radio-frequency band, and a level of the radiated electromagnetic noise may also increase.

The weighting factor calculation unit 300 has a function of calculating a weighting factor Kp for the duty ratio controlled by the pulse width control unit 100 and a weighting factor Kv for the drive voltage $V_d$ controlled by the drive voltage control unit 200. As will be described in detail later, the weighting factor Kp and the weighting factor Kv can change nonlinearly with respect to a jitter of the output voltage $V_{out}$ of the switching power supply circuit 1000. In the present embodiment, a case where the weighting factor Kp and the weighting factor Kv change nonlinearly with respect to the jitter of the output voltage $V_{out}$ of the switching power supply circuit 1000 will be described in detail, but the weighting factor Kp and the weighting factor Kv can also change linearly with respect to the jitter of the output voltage $V_{out}$.

As an example, the weighting factor calculation unit 300 can calculate the weighting factor Kp such that the weighting factor Kp for the duty ratio increases when the output voltage $V_{out}$ increases, and the weighting factor Kp for the duty ratio decreases when the output voltage $V_{out}$ decreases. Conversely, the weighting factor calculation unit 300 can calculate the weighting factor Kv such that the weighting factor Kv for the drive voltage $V_d$ decreases when the output voltage $V_{out}$ increases, and the weighting factor Kv for the drive voltage $V_d$ increases when the output voltage $V_{out}$ decreases.

As described above, by the weighting factor calculation unit 300 calculating the weighting factor Kp and the weighting factor Kv, a proportion of the output voltage $V_{out}$ controlled based on the drive voltage $V_d$ increases when the output voltage $V_{out}$ decreases. Further, even when the output voltage $V_{out}$ that is initially set is small, the proportion of the output voltage $V_{out}$ controlled based on the drive voltage $V_d$ increases.

The difference calculation unit 400 compares a voltage value of the output voltage $V_{out}$ measured by the output voltage measurement unit 500 with a set voltage value set by the output voltage setting unit 600, and calculates difference information between the voltage value of the output voltage $V_{out}$ and the set voltage value. The difference information may be an analog voltage value represented by an analog signal, or may be a digital voltage value represented by a digital signal.

As described above, the output voltage measurement unit 500 has a function of measuring the voltage value of the output voltage $V_{out}$ of the switching power supply circuit 1000. Since a configuration of the output voltage measurement unit 500 is a known technique, a detailed description thereof will be omitted.

As described above, the output voltage setting unit 600 has a function of outputting the set voltage value set as the output voltage $V_{out}$ of the switching power supply circuit 1000. The set voltage value is input into the difference calculation unit 400 and the weighting factor calculation unit 300. Set voltage value information indicating the set voltage value may be an analog set voltage value represented by an analog signal, or may be a digital voltage value represented by a digital signal.

Since configurations of the switching transistors SWp100, SWn100, the transformer Tr100, the rectifier circuit unit 800, and the low-pass filter unit 700 are known techniques, a detailed description thereof will be omitted.

The input voltage source $V_{200}$ is configured such that the drive voltage $V_d$, which is the output voltage of the input voltage source $V_{200}$, can be changed by the drive voltage control unit 200. That is, the drive voltage $V_d$ of the input voltage source $V_{200}$ is a variable output.

Figure 4B:
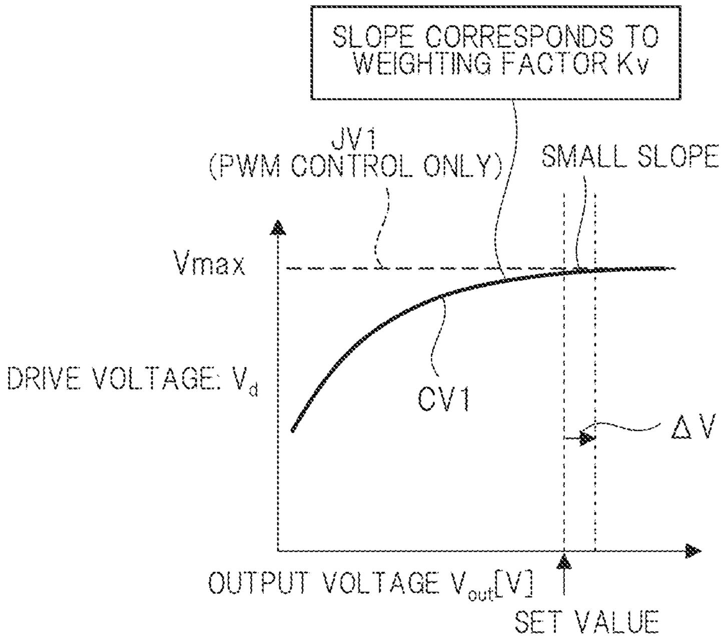
FIG. 4B is a diagram illustrating a change in a weighting factor $K_v$, which is calculated by the weighting factor calculation unit of the switching power supply circuit according to the present embodiment in FIG. 3, by a slope of a curve CV1.

(A) of FIG. 4 is a diagram illustrating an example of a control operation for the duty ratio controlled by the pulse width control unit 100 in a case where the output voltage of the switching power supply circuit 1000 according to the present embodiment fluctuates, or in a case where a load fluctuates. A straight line JP1 illustrated as a comparative example illustrates an example of a control operation for the duty ratio of the switching power supply circuit in the related art using only the PWM control. In the switching power supply circuit in the related art, in a region R1, a voltage of the input voltage source remains large while the duty ratio decreases, and therefore, as described in (E) of FIG. 2, the radiated electromagnetic noise is generated in the radio-frequency band and the level of the radiated electromagnetic noise increases. That is, in the switching power supply circuit in the related art, since the duty ratio of the switching power supply circuit decreases when the output voltage is set to be small, the radiated electromagnetic noise moves from the low frequency band to the radio-frequency band, and the level of the radiated electromagnetic noise also increases. In addition, due to a load jitter, the duty ratio of the switching power supply circuit in the related art decreases even when the output voltage of the switching power supply circuit decreases, and therefore, the radiated electromagnetic noise moves from the low frequency band to the radio-frequency band.

However, the pulse width control unit 100 of the switching power supply circuit 1000 according to the present embodiment controls, based on a curve CP1, the duty ratio not to enter the region R1 (the output voltage is not controlled in the region R1). When the output voltage of the switching power supply circuit 1000 is large, the duty ratio is set to be large. However, as the output voltage of the switching power supply circuit 1000 decreases, a slope of the curve CP1 decreases, and the pulse width control unit 100 controls the duty ratio such that the duty ratio gradually approaches the duty ratio lower limit value DML. The slope of the curve CP1 corresponds to the weighting factor Kp for the duty ratio determined by the weighting factor calculation unit 300. As illustrated in (A) of FIG. 4, when the output voltage $V_{out}$ increases by ΔV, the slope of the curve CP1 increases, and the weighting factor Kp for the duty ratio also increases.

(B) of FIG. 4 is a diagram illustrating an example of a control operation of the drive voltage control unit 200 in a case where the output voltage of the switching power supply circuit 1000 according to the present embodiment fluctuates, or in a case where the load fluctuates. A straight line JV1 illustrated as a comparative example is a graph illustrating a power supply voltage applied to the switching transistors SWp and SWn of the switching power supply circuit in the related art using only the PWM control. As described above, since the switching power supply circuit in the related art does not include the drive voltage control unit 200 according to the present embodiment, the output voltage value of the input voltage source is a constant value even when the output voltage value of the switching power supply circuit decreases. That is, in the straight line JV1, the same voltage is applied to the switching transistors SWp and SWn regardless of the output voltage value of the switching power supply circuit.

However, the drive voltage control unit 200 of the switching power supply circuit 1000 according to the present embodiment controls, based on a curve CV1, the drive voltage $V_d$, which is an output voltage of the input voltage source $V_{200}$. For example, when the output voltage $V_{out}$ of the switching power supply circuit 1000 decreases from a maximum value $V_{max}$ of the output voltage of the input voltage source $V_{200}$ of the switching power supply circuit 1000, the drive voltage control unit 200 outputs a voltage close to the maximum value. However, the drive voltage $V_d$, which is the output voltage value of the input voltage source $V_{200}$, rapidly decreases as illustrated by the curve CV1. A slope of the curve CV1 corresponds to the weighting factor Kv for the drive voltage $V_d$ determined by the weighting factor calculation unit 300. As illustrated in (B) of FIG. 4, when the output voltage $V_{out}$ increases by ΔV, the slope of the curve CV1 decreases, and the weighting factor Kv for the drive voltage $V_d$ also decreases.

As can be seen from (A) and (B) of FIG. 4, in the switching power supply circuit 1000, when the duty ratio gradually approaches the duty ratio lower limit value DML, a proportion of an output voltage controlled based on the duty ratio decreases (the weighting factor Kp decreases), and a proportion of an output voltage controlled based on the drive voltage $V_d$ increases (the weighting factor Kv increases). In addition, in the switching power supply circuit 1000, when the duty ratio increases from the duty ratio lower limit value DML, the proportion of the output voltage controlled based on the duty ratio increases (the weighting factor Kp increases), and the proportion of the output voltage controlled based on the drive voltage $V_d$ decreases (the weighting factor Kv decreases).

FIG. 5 is an image diagram schematically illustrating a change in the weighting factor Kp and a change in the weighting factor Kv with respect to a change in the output voltage $V_{out}$. As described above, as the output voltage $V_{out}$ increases, the weighting factor Kp increases nonlinearly, and the weighting factor Kv decreases nonlinearly. A value of the output voltage $V_{out}$ corresponding to an intersection of a curve drawn for the weighting factor Kp and a curve drawn for the weighting factor Kv can be set to any value.

Figure 6A:
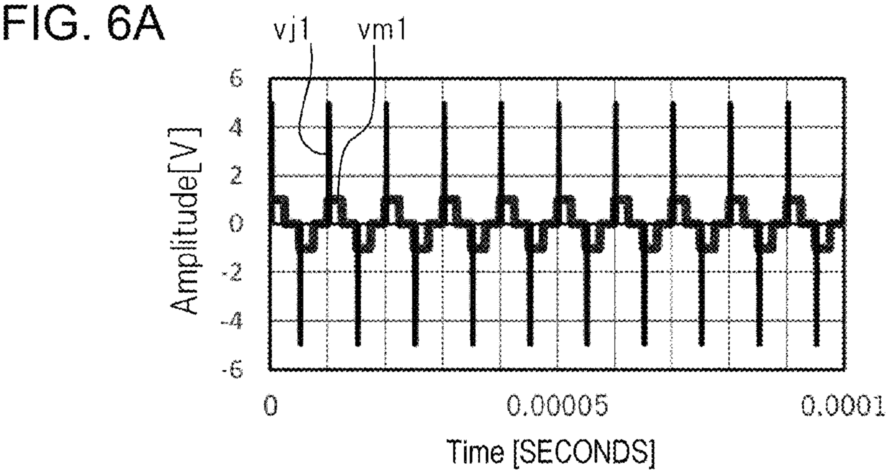
FIG. 6A is a diagram comparing waveforms in an example of pulses applied to the gates of the switching transistors of the switching power supply circuit according to the comparative example in FIG. 1 and an example of pulses applied to gates of switching transistors of the switching power supply circuit according to the present embodiment in FIG. 3 in order to generate the same output voltage.
Figure 6B:
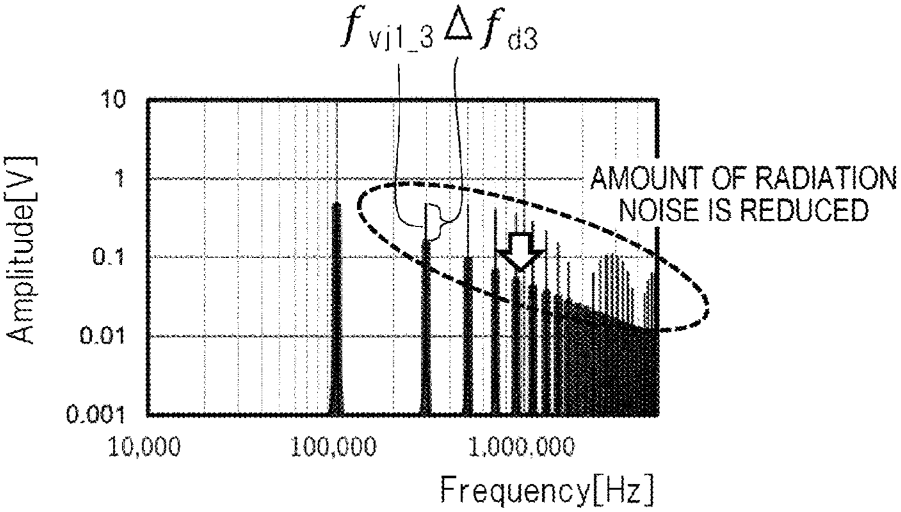
FIG. 6B is a diagram comparing frequency characteristics of radiated electromagnetic noises generated by the waveforms in FIG. 6A.

Operation Example (A) of FIG. 6 is a diagram comparing waveforms in an example (vj1) of pulses applied to gates of switching transistors of a switching power supply circuit according to a comparative example in FIG. 1 and an example (vm1) of pulses applied to the gates of the switching transistors of the switching power supply circuit according to the present embodiment in FIG. 3 in order to generate the same output voltage.

The pulse vj1 according to the comparative example is a pulse having a proportion of the duty ratio of 5% and an amplitude of 5 volts. On the other hand, the pulse vm1 according to the present embodiment is a pulse having a proportion of the duty ratio of 25% and an amplitude of 1 volt. The pulse vj1 and the pulse vm1 are pulses on an input side formed to generate a voltage having an output voltage of about 0.25 volts. In the present embodiment, since a proportion of the duty ratio lower limit value DML is set to 20%, a voltage value of the pulse vm1 is lowered instead of setting the proportion of the duty ratio to 25% in order to generate a small output voltage. The pulse vm1 is shown as an example, and for example, the proportion of the duty ratio of the pulse vm1 may be set to a value larger than 25%, and an amplitude value of the pulse vm1 may be set to be smaller than 1 volt. In this case, it is expected that a frequency band of a radiated electromagnetic noise generated by the pulse vm1 further decreases, and a level of the radiated electromagnetic noise also further decreases.

(B) of FIG. 6 is a diagram comparing frequency characteristics of radiated electromagnetic noises generated by the waveforms in (A) of FIG. 6. A radiated electromagnetic noise $f_{vj1}$ generated by the pulse vj1 is a third harmonic of the radiated electromagnetic noise of the pulse vj1. In addition, a radiated electromagnetic noise $f_{vm1}$ generated by the pulse vm1 is a third harmonic of the radiated electromagnetic noise of the pulse $v_{m1}$. It is understood that the radiated electromagnetic noise $f_{vm1}$ is smaller than the radiated electromagnetic noise $f_{vj1}$ by Δfd3, and the radiated electromagnetic noise of the switching power supply circuit according to the present embodiment is smaller than the radiated electromagnetic noise of the switching power supply circuit that executes only the PWM control according to the comparative example. In addition, as illustrated in (B) of FIG. 6, it is understood that even in a n-th harmonic (n is an odd number) such as a fifth harmonic and a seventh harmonic, the radiated electromagnetic noise of the switching power supply circuit according to the present embodiment is smaller than the radiated electromagnetic noise of the switching power supply circuit that executes only the PWM control according to the comparative example.

With the above switching power supply circuit according to the present embodiment, it is possible to provide a switching power supply circuit that can reduce an amount of the radiated electromagnetic noise in the radio-frequency band even in a case of a jitter in the load, a set voltage, or the like. That is, with the switching power supply circuit according to the present embodiment, a noise component around a transformer during a small voltage output can be reduced, and the electromagnetic radiation noise can be prevented. Further, even when hardware of an electronic device using the switching power supply circuit according to the present embodiment is updated and the load or a voltage value to be controlled fluctuates, the electromagnetic radiation noise can be prevented, and an influence on the electronic device can be reduced.

Modification (A) and (B) of FIG. 7 are each a diagram illustrating another example of the weighting factor Kp for the duty ratio controlled by the pulse width control unit 100 and the weighting factor Kv for the drive voltage $V_d$ controlled by the drive voltage control unit 200 of a switching power supply circuit according to a modification of the present embodiment.

(A) of FIG. 7 illustrates a relation between the weighting factor Kp and the weighting factor Kv when the duty ratio is larger than the duty ratio lower limit value DML. When the duty ratio is larger than the duty ratio lower limit value DML, the weighting factor Kp for the duty ratio is expressed by Formula (1), where $V_{out}$ is a set output voltage value and $V_{outmax}$ is a maximum output voltage value of the switching power supply circuit. That is, the weighting factor Kp is a value obtained by dividing the set output voltage value by the maximum output voltage value of the switching power supply circuit. In addition, the weighting factor Kv is expressed by Formula (2) in which the weighting factor Kp is subtracted from 1. As is clear from Formula (1) and Formula (2), the weighting factor Kv and the weighting factor Kp are added to obtain 1, as illustrated in Formula (3).

(B) of FIG. 7 illustrates a relation between the weighting factor Kp and the weighting factor Kv when the duty ratio is equal to or smaller than the duty ratio lower limit value DML. Since it is expected that the radiated electromagnetic noise increases in a radio-frequency band when the duty ratio is equal to or smaller than the duty ratio lower limit value DML, the weighting factor Kp for the duty ratio is fixed to "0", as illustrated in Formula (4). That is, when the duty ratio obtained as a calculation result is equal to or smaller than the duty ratio lower limit value DML, the switching power supply circuit according to the present modification does not execute the PWM control. Further, when the duty ratio is equal to or smaller than the duty ratio lower limit value DML, the weighting factor Kv for the drive voltage $V_d$ controlled by the drive voltage control unit 200 is fixed to "1", as illustrated in Formula (5). That is, when the duty ratio obtained as a calculation result is equal to or smaller than the duty ratio lower limit value DML, the switching power supply circuit according to the present modification controls the output voltage based on the drive voltage.

With the above switching power supply circuit according to the modification of the present embodiment, when the duty ratio obtained as the calculation result is equal to or smaller than the duty ratio lower limit value DML due to a jitter in a load, a set voltage, or the like, the weighting factor Kp is fixed to "0", and the weighting factor Kv is fixed to "1". As a result, it is possible to provide a switching power supply circuit that can reduce an amount of a radiated electromagnetic noise in the radio-frequency band. That is, with the switching power supply circuit according to the present modification, a noise component in the radio-frequency band around a transformer during a small voltage output can be reduced, and the radiated electromagnetic noise can be prevented. Further, even when hardware of an electronic device using the switching power supply circuit according to the present modification is updated and the load or the voltage value to be controlled fluctuates, the radiated electromagnetic noise in the radio-frequency band can be prevented, and an influence on the electronic device can be reduced.

Figure 8:
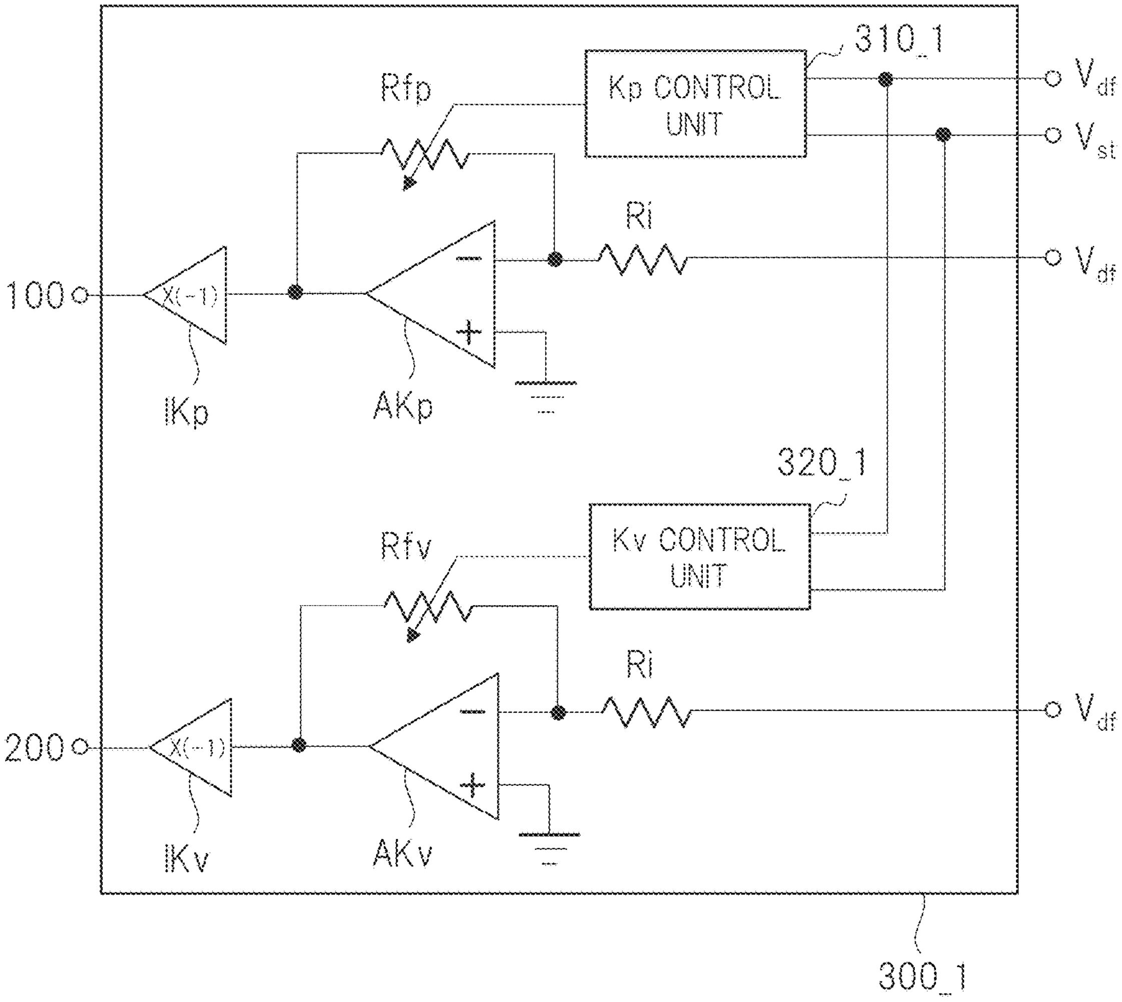
FIG. 8 is a diagram illustrating an example of a weighting factor calculation unit of the switching power supply circuits according to the present embodiment and the modification of the present embodiment.

FIG. 8 is a circuit diagram of a weighting factor calculation unit 300_1 constituted by mainly using the weighting factor calculation unit 300 as an analog circuit. An operational amplifier AKp calculates the weighting factor Kp based on an input resistance Ri and a variable resistance Rfp. A Kp control unit 310_1, which controls the weighting factor Kp, receives as inputs a difference voltage $V_{df}$ output from the difference calculation unit 400 and a set voltage $V_{st}$ output from the output voltage setting unit 600 illustrated in FIG. 3, and controls a value of the variable resistance Rfp such that (Rfp/Ri)=weighting factor Kp. The weighting factor Kp is multiplied by the difference voltage $V_{df}$, a multiplication result is inverted by an inverting amplifier Ikp, and a calculation result is output as a pulse width control value to the pulse width control unit 100.

Similarly, an operational amplifier AKv calculates the weighting factor Kv based on the input resistance Ri and a variable resistance Rfv. A Kv control unit 320_1, which controls the weighting factor Kv, receives as inputs the difference voltage $V_{df}$ output from the difference calculation unit 400 and the set voltage $V_{st}$ output from the output voltage setting unit 600 illustrated in FIG. 3, and controls a value of the variable resistance Rfv such that (Rfv/Ri) =weighting factor Kv. The weighting factor Kv is multiplied by the difference voltage $V_{df}$, a multiplication result is inverted by an inverting amplifier Ikv, and a calculation result is output as a drive voltage control value to the drive voltage control unit 200.

FIG. 9 is a circuit diagram of a weighting factor calculation unit 300_2 configured with mainly using the weighting factor calculation unit 300 as a digital circuit. A Kp control unit 310_2 receives as inputs the difference voltage $V_{df}$ output from the difference calculation unit 400 and the set voltage $V_{st}$ output from the output voltage setting unit 600 illustrated in FIG. 3, and calculates the weighting factor Kp. Then, the weighting factor Kp is multiplied by the difference voltage $V_{df}$, and a calculation result is output as a pulse width control value to the pulse width control unit 100. In addition, a Kv control unit 320_2 receives as inputs the difference voltage $V_{df}$ output from the difference calculation unit 400 and the set voltage $V_{st}$ output from the output voltage setting unit 600 illustrated in FIG. 3, and calculates the weighting factor Kv. Then, the weighting factor Kv is multiplied by the difference voltage $V_{df}$, and a calculation result is output as a drive voltage control value to the drive voltage control unit 200.

FIG. 10 is a lookup table of the weighting factor Kp and the weighting factor Kv that can be used by the weighting factor calculation unit 300_1 and/or the weighting factor calculation unit 300_2. The lookup table can be stored in a storage unit (not illustrated) provided in the weighting factor calculation unit 300_1 and/or the weighting factor calculation unit 300_2. In addition, the lookup table can also be stored in a storage unit (not illustrated) provided outside the weighting factor calculation unit 300_1 and/or the weighting factor calculation unit 300_2. The lookup table of the weighting factor Kp and the weighting factor Kv illustrated in FIG. 10 indicates results calculated based on the formulas illustrated in FIG. 7.

Therefore, the weighting factor calculation unit 300_1 and/or the weighting factor calculation unit 300_2 can also calculate the weighting factor Kp and the weighting factor Kv based on the formulas illustrated in FIG. 7 without using the lookup table illustrated in FIG. 10.

Figure 11A:
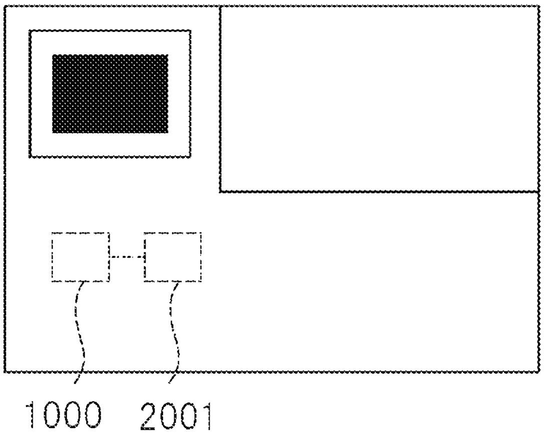
FIG. 11A is a schematic diagram illustrating an example of an industrial device incorporating the switching power supply circuits according to the present embodiment and the modification of the present embodiment.
Figure 11B:
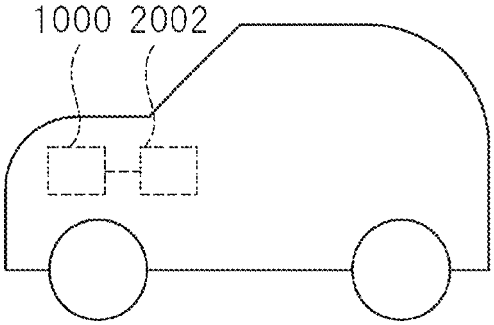
FIG. 11B is a schematic diagram illustrating an example of a vehicle incorporating the switching power supply circuits according to the present embodiment and the modification of the present embodiment.

(A) and (B) of FIG. 11 are each a schematic diagram illustrating an example in which the switching power supply circuit according to the present embodiment or the modification of the present embodiment is mounted on an electronic device. The electronic device is not limited to the electronic devices illustrated in (A) and (B) of FIG. 11, and means all electronic devices on which the switching power supply circuit according to the present embodiment or the modification of the present embodiment can be mounted.

(A) of FIG. 11 is an example of an industrial device on which the switching power supply circuit 1000 is mounted. In the industrial device, a load using the output voltage of the switching power supply circuit 1000 or a control circuit using the output voltage as a control voltage is illustrated as 2001.

(B) of FIG. 11 is an example of a vehicle on which the switching power supply circuit 1000 is mounted. An ECU mounted on the vehicle may be updated, and as described above, the switching power supply circuit 1000 is compatible with this update. In the vehicle, a load using the output voltage of the switching power supply circuit 1000 or a control circuit using the output voltage as a control voltage is illustrated as 2002.

According to the above embodiment, in fields of mobility and industrial devices, even after a partial update for hardware for long-term use and long-term operation, it is possible to ensure stable operation of a system including the electronic device. For example, as described above, with the switching power supply circuit according to the present embodiment, it is possible to provide a switching power supply circuit that can reduce the amount of the radiated electromagnetic noise in the radio-frequency band even in a case of the jitter in the load, the set voltage, or the like.

Although the above switching power supply circuit is described as a center tap type, the switching power supply circuit according to the present embodiment and the modification is not limited to the center tap type. For example, techniques of the present embodiment and the modification can be applied to a ringing choke type, a fly back type, a forward type, a half-bridge type, a full-bridge type, a non-insulation type step-down type, a step-up type, or a resonant type switching power supply circuit.

Although the invention made by the present inventors has been specifically described based on the embodiments, the invention is not limited to the above embodiments, and it is needless to say that various modifications can be made without departing from the gist of the invention. For example, the above embodiments are described in detail to facilitate understanding of the invention, and the invention is not necessarily limited to those including all the configurations described above. In addition, another configuration can be added to, deleted from, or replaced with a part of a configuration of each embodiment.

REFERENCE SIGNS LIST

100 pulse width control unit
200 drive voltage control unit

300, 300_1, 300_2 weighting factor calculation unit
400 difference calculation unit
500 output voltage measurement unit
600 output voltage setting unit
700 low-pass filter unit
800 rectifier circuit unit
Tr100 transformer
SWp100, SWn100 switching transistor
$V_{200}$ input voltage source

The invention claimed is:

1. A switching power supply circuit comprising:

a pulse width control unit configured to control a pulse width of a pulse voltage output from a switching transistor;

a drive voltage control unit configured to control a drive voltage for determining a magnitude of the pulse voltage output from the switching transistor; and a weighting factor calculation unit configured to determine a weighting factor for the pulse width and a weighting factor for the drive voltage based on a difference value between a set output voltage value set in advance for a power supply circuit and a measured output voltage value, which is a result of measuring an output voltage of the power supply circuit, and the set output voltage value.

2. The switching power supply circuit according to claim 1, wherein the weighting factor calculation unit is configured to calculate the weighting factor for the pulse width such that the weighting factor for the pulse width increases when the measured output voltage value increases and decreases when the measured output voltage value decreases, calculate the weighting factor for the drive voltage such that the weighting factor for the drive voltage decreases when the measured output voltage value increases and increases when the measured output voltage value decreases, and calculate the weighting factor for the pulse width such that a duty ratio of the pulse voltage is not smaller than a predetermined duty ratio.

3. The switching power supply circuit according to claim 1, wherein the weighting factor for the pulse width and the weighting factor for the drive voltage are positive values, and a value obtained by adding the weighting factor for the pulse width and the weighting factor for the drive voltage is 1.

4. The switching power supply circuit according to claim 3, wherein the weighting factor for the pulse width is a value obtained by dividing the set output voltage value by a maximum output voltage value of the power supply circuit, and the weighting factor for the drive voltage is a value obtained by subtracting the weighting factor for the pulse width from 1.

5. The switching power supply circuit according to claim 4, wherein when a duty ratio of the pulse voltage is smaller than a predetermined duty ratio, the weighting factor for the pulse width is set to 0, and the weighting factor for the drive voltage is set to 1, and the pulse width control unit controls the duty ratio of the pulse voltage to be fixed to the predetermined duty ratio.

6. The switching power supply circuit according to claim 1, further comprising:

a transformer including the switching transistor on a primary side, a rectifier circuit on a secondary side, and a low-pass filter circuit.

7. An electronic device comprising:

the switching power supply circuit according to claim 1; and a control circuit configured to use the output voltage supplied from the power supply circuit as a control voltage.

* * * * *